United States Patent
Haager

(10) Patent No.: US 8,641,069 B2
(45) Date of Patent: Feb. 4, 2014

(54) APPARATUS FOR STORING AIR

(76) Inventor: Alexander Haager, Mistelbach (AT)

( * ) Notice: Subject to any disclaimer, the term of this patent is extended or adjusted under 35 U.S.C. 154(b) by 0 days.

(21) Appl. No.: 12/737,291

(22) PCT Filed: Jun. 24, 2009

(86) PCT No.: PCT/AT2009/000253
§ 371 (c)(1),
(2), (4) Date: Mar. 3, 2011

(87) PCT Pub. No.: WO2009/155628
PCT Pub. Date: Dec. 30, 2009

(65) Prior Publication Data
US 2011/0148067 A1    Jun. 23, 2011

(30) Foreign Application Priority Data
Jun. 27, 2008   (AT) .................................. 1027/2008

(51) Int. Cl.
*B62J 1/00*   (2006.01)
(52) U.S. Cl.
USPC ........................................................ 280/201
(58) Field of Classification Search
USPC ........................................................ 280/201
See application file for complete search history.

(56) References Cited

U.S. PATENT DOCUMENTS

| | | | | |
|---|---|---|---|---|
| 5,016,894 A * | 5/1991 | Alioto | ........................... | 280/201 |
| 5,127,804 A * | 7/1992 | Chappell | ....................... | 417/231 |
| 5,131,671 A * | 7/1992 | Wilhelms | ...................... | 280/201 |
| 5,324,174 A * | 6/1994 | Diotte | ........................... | 417/234 |
| 5,499,858 A * | 3/1996 | Her | ............................. | 297/195.1 |
| 5,890,725 A * | 4/1999 | Wood | ........................... | 280/201 |
| 6,120,258 A * | 9/2000 | Chen | ............................ | 417/231 |
| 6,189,905 B1* | 2/2001 | Yelverton | ..................... | 280/201 |
| 7,520,521 B2* | 4/2009 | Hsu | ............................... | 280/276 |
| 7,798,786 B2* | 9/2010 | Robinson | ..................... | 417/231 |

FOREIGN PATENT DOCUMENTS

| | | |
|---|---|---|
| DE | 670808 | 1/1939 |
| DE | 831206 | 2/1952 |
| DE | 855965 | 11/1952 |
| DE | 874256 | 4/1953 |
| DE | 7337703 | 3/1974 |
| DE | 8815229 | 5/1989 |
| EP | 1581423 | 2/2008 |
| FR | 606 092 | 6/1926 |
| WO | 95/07207 | 3/1995 |

* cited by examiner

*Primary Examiner* — Kevin Hurley
*Assistant Examiner* — Michael Stabley
(74) *Attorney, Agent, or Firm* — Jacobson Holman PLLC

(57) ABSTRACT

On an apparatus for generating and/or storing compressed air, particularly for filling tires of a vehicle, particularly a bicycle, it is provided that the apparatus is accommodated in an element (17), particularly a frame element of the vehicle.

8 Claims, 5 Drawing Sheets

APPARATUS FOR STORING AIR

This is a national stage of PCT/AT09/000253 filed Jun. 24, 2009 and published in German, which has a priority of Austria no. 1027/2008 filed Jun. 27, 2008, hereby incorporated by reference.

The present invention relates to a device for generating and/or storing compressed air for filling tires of a vehicle, in particular bicycle, wherein the device is received in an element, or frame element, of the vehicle and compressed air is generated by a relative movement of a pump cylinder relative to a pump rod fixed to an element.

Devices for storing and/or generating compressed air have been known for long in various configurations. Thus, usual compressed-air storage devices available at service stations are, for instance, intended to at least partially inflate car or bicycle tires and/or bring the pressure of bicycle or car tires to an appropriate level either by supplying or by releasing compressed air.

Concerning bicycles, bicycle pumps of conventional types are usually included in the delivered bicycle and sold in a manner fastened thereto, or such devices, in particular mechanical devices or devices equipped with gas cartridges, are to be carried along separately and fastened to the respective vehicle in a more or less complicated manner and are, moreover, merely intended for the on-site generation of compressed air, having no storage facilities.

On account of the fastening and retaining problems of such pumps to or on the frames of vehicles, in particular bicycles, and due to the problem that only small and inefficient pumps can, as a rule, be fastened to a bicycle frame, there is usually the problem that, in the event of a loss of air, particularly with bicycles, either places where stationary pumps are available will have to be found or attempts will have to be made to pump up again the tire of a bicycle, scooter or similar vehicle equipped with air tires by ill-suited or unsuited means in order to continue the ride with sufficient tire pressure.

From EP-B 1581423, a refillable pumping device has already become known, which is integrated in a cylinder supporting the saddle of a bicycle. In such a refillable pumping device, a cylindrical chamber containing the gas for inflating the bicycle tire is integrated in the supporting device for the saddle, and the compression device is filled with liquid gas in order to enable a bicycle tire to be rapidly and reliably inflated.

From DE-8815229.4 U, a bicycle having a tiltable saddle is known, wherein an air pump required for inflating its wheels is integrated in the frame of the bicycle below the bicycle saddle after having tilted the saddle from the bicycle frame. Such a pumping device, on the one hand, is to ensure that the inflation of a bicycle can be performed without stooping and, on the other hand, provides securement of the bicycle pump against theft.

From DE-U 7337703, the theft-proof storage of a bicycle air pump in the seat post of a bicycle has become known, wherein the bicycle pump is inserted in the seat post and has to be removed from the same for pumping up a bicycle.

From DE-B 831206, a saddle air pump for inflating bicycle tires has become known, in which a frame tube and the frame connection piece sliding therein, of a bicycle form an air pump by the frame tube being air-tightly closed relative to a bottom plate and a compression air exit nozzle being formed in the frame tube.

From FR-A 606092, a bicycle pump has become known which forms part of a seat post and whose pump rod is fixed to a frame by screw connections formed within the frame and the air exit valve is configured to pass through the bicycle frame.

From DE-B 855965, an air pump arranged in a bicycle frame and including a multi-part, telescopic piston rod has become known, in which the piston rod is fixed to the saddle frame by the aid of a lock and actuatable after unlocking from the frame tube.

The present invention aims to provide a device for generating and/or storing compressed air, which overcomes the above-mentioned problems and which is, in particular, unloosably mounted to or in the vehicle comprising the tires to be inflated.

To solve these objects, the present invention is essentially characterized in that the pump cylinder, via an end portion, is detachably fastened to the element, particularly by the aid of a retention part including a lock, that the pump cylinder is provided with at least one compressed air discharge opening configured as a valve, and that the pump cylinder is guided within the frame part via a spring-loaded slide bearing including air passage openings. By the device for generating and/or storing compressed air being received in an element, particularly frame part, of the vehicle, it is feasible to safeguard that compressed air and, in particular, sufficient compressed air will be available for increasing the tire pressure of the vehicle at any time and, in particular, at any place, and that, in addition, a unit comprised of the device for generating and/or storing compressed air and the vehicle will be provided so as to enable not only the provision of a shapely and aesthetic vehicle exterior but, at the same time, also the reasonable utilization of cavities and spaces available on the vehicle and, in particular, on the vehicle frame by the device according to the invention.

The device is, moreover, further developed to the effect that compressed air is generated by a relative movement of a pump cylinder relative to a pump rod fixed to an element, optionally in a detachable manner. In that the compressed air is further generated via a relative movement of mutually movable parts and, in particular, a pump cylinder relative to a pump rod optionally detachably fixed to an element, it is feasible to fill the bicycle tire at any time and any place by moving parts of the device for generating and/or storing compressed air which are integrated in the bicycle frame, while at the same ensuring that the parts of the device for generating and/or storing compressed air are mounted in the element, particularly bicycle frame, in a manner unloosable and substantially invisible from outside.

In order to ensure that the device for generating and/or storing compressed air can be serviced at any time, and in order to additionally ensure that no inadvertent displacement of the individual pump parts relative to the element, particularly frame part of the bicycle, will occur during riding, the pump cylinder according to the invention is detachably fixed to the element by an end portion, particularly by the aid of a retention part comprising a lock. Such a fixation of the pump cylinder to the element or frame part will, on the one hand, provide the ability to access the pump cylinder and check its functionality at any time and, on the other hand, ensure that no inadvertent movement of the pump cylinder out of the element or frame part will take place.

By realizing the fixation by the aid of a retention part comprising a lock, the retention part can be easily detached from the end portion by disengaging the lock, and a pump movement of the pump cylinder relative to the pump rod can be readily performed or effected.

In order to be able to safely and reliably fill a bicycle tire with air, the pump cylinder according to the invention is provided with at least one discharge opening for compressed air, which is configured as a valve. By the pump cylinder being provided with at least one discharge opening for compressed air, which is configured as a valve, it is not necessary with the device for generating and/or storing compressed air to insert an additional valve into the element, particularly frame part of a bicycle, and hence possibly weaken the frame part as a whole. In the configuration comprising a pump cylinder communicating with a discharge opening, it is, for instance, possible, as in correspondence with a further development of the invention, that the discharge opening provided with a valve is formed in the end portion such that, in the event of failures at the valve or at the discharge opening, the device for generating and/or storing compressed air can optionally be made to function again in a simple and reliably manner.

By the pump cylinder being guided within the frame part via a spring-loaded slide bearing including air passage openings, it is feasible to readily and reliably generate the pressure required for inflating the vehicle tire by a pumping movement of the pump piston in the element or frame part such that a vehicle tire can be rapidly and reliably fed with the necessary compressed air, if need be.

In that, as in correspondence with a further development of the invention, the lock is designed as a latch pin, the detachment of the end portion from the retention part can be effected by simply tilting the latch pin or unlocking the latch pin such that the device for generating and/or storing compressed air can be rapidly and reliably put into operation and the vehicle tire can be brought to the required pressure by simple pumping.

In that, as in correspondence with a preferred further development of the invention, the discharge opening is connectable with an air filling opening of a tire, it is possible without any further apparative expenditure to fill with compressed air directly by the device for generating and/or storing compressed air particularly a vehicle tire, thus providing sufficient amount of compressed air at any time in order to be able to, for instance, safely and reliably complement air escaped during driving from a tire capable of being filled with air.

For a particularly simple maintenance of the device for generating and/or storing compressed air, the invention is further developed to the extent that the pump rod is detachably fixed in a piston nut detachably fixed in the element, particularly frame part. By the pump rod being detachably fixed in a piston nut detachably fixed in the element, particularly frame part, it is feasible in a simple manner to perform maintenance work, and optionally simply and reliably exchange defective parts, by removing the piston nut.

According to the further development of the invention, the device is configured such that the pump piston end facing away from the slide bearing comprises the detachably fixed end portion, and that the discharge opening for compressed air is formed in said end portion. Such a configuration, in addition to providing a reliable pump performance of the device for generating and/or storing compressed air will, moreover, ensure that, in case of need, all parts of the device can be readily and reliably serviced and/or separately exchanged.

In that, as in correspondence with a further development of the invention, the device for generating and/or storing compressed air is further developed such that the element is formed by a, particularly cushion-mounted or resiliently mounted, fork part, frame spar for a handlebar and/or frame part for mounting a saddle and/or a saddle tube, the device for generating and/or storing compressed air can be readily and reliably transferred from the resting position into the operating position without having to detach, remove or optionally turn down any parts of the bicycle, wherein it is possible, by merely moving a bicycle part relative to another, for instance the saddle relative to the saddle tube, the handlebar relative to the frame spar for a handlebar, to provide the required pump performance, and hence the required amount of compressed air, and to readily and reliably fill air tires in the appropriate manner. In order to ensure such simple and reliable filling without folding away or removing individual bicycle parts, the invention is further developed to the effect that a head portion of the fork part, the handlebar or the saddle is, optionally detachably, fixed to the end portion so as to enable the required generation of compressed air by merely moving the handlebar or the saddle relative to the respective frame parts.

In the following, the invention will be explained in more detail by way of exemplary embodiments schematically illustrated in the accompanying drawing. Therein:

Figure 6:
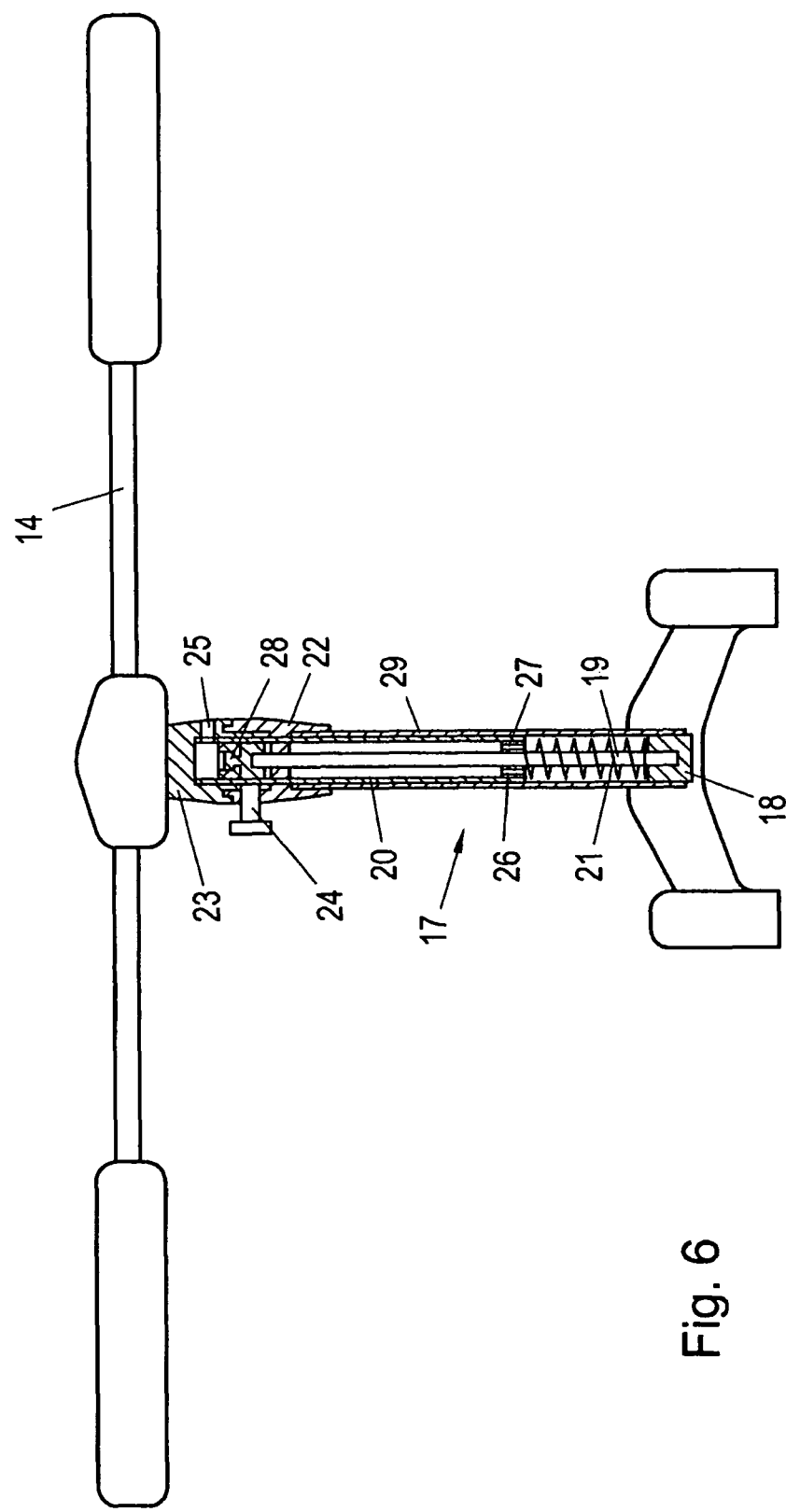
Figure 7:
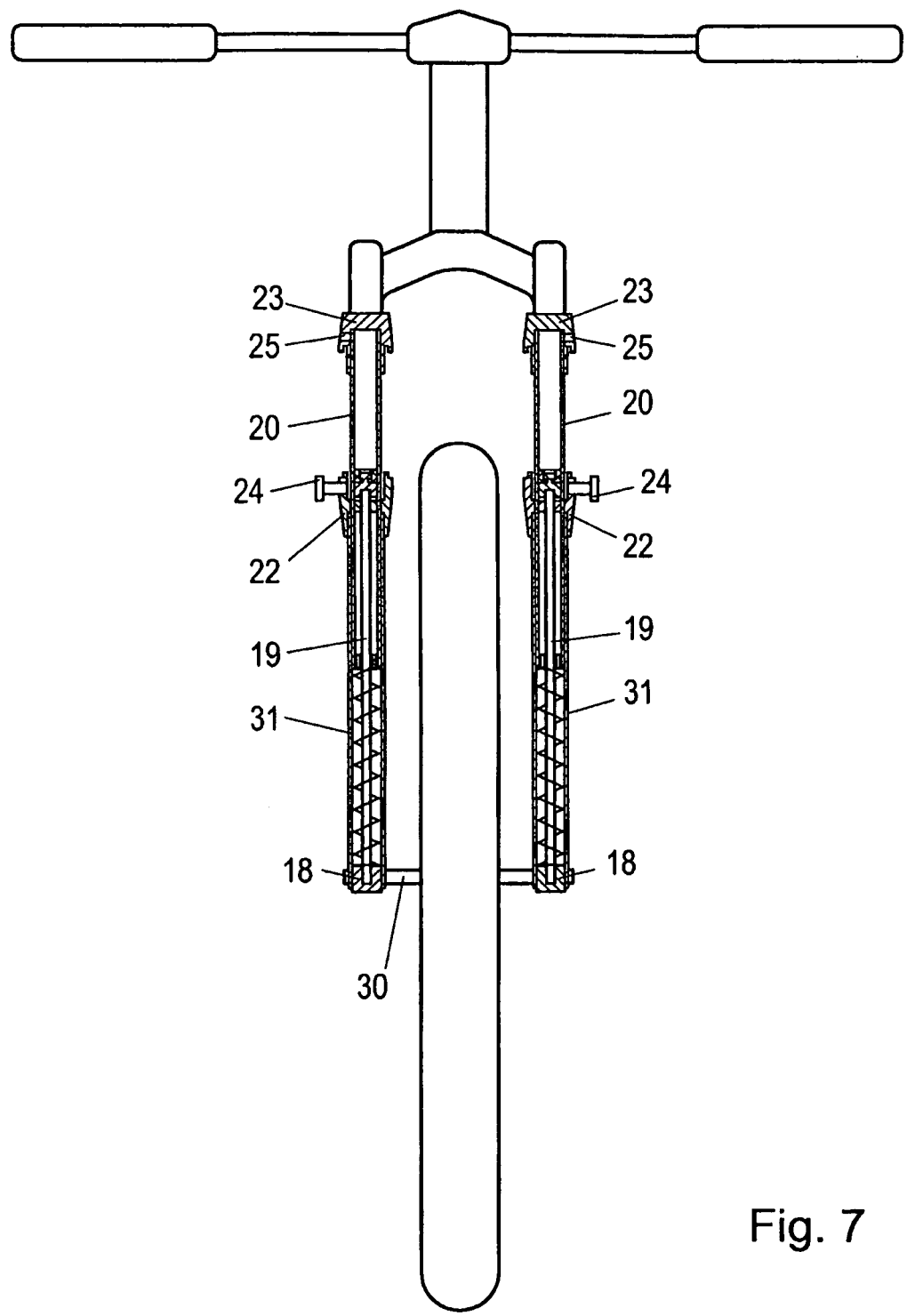

FIG. 6 is a view of a bicycle handlebar and the associated frame spar for the handlebar, in which the device for generating and/or storing compressed air according to the invention is integrated, in the resting position; and FIG. 7 is a view of a bicycle fork in which a device for generating and/or storing compressed air according to the invention is each integrated in the two fork elements, in operation positions.

Figure 1:
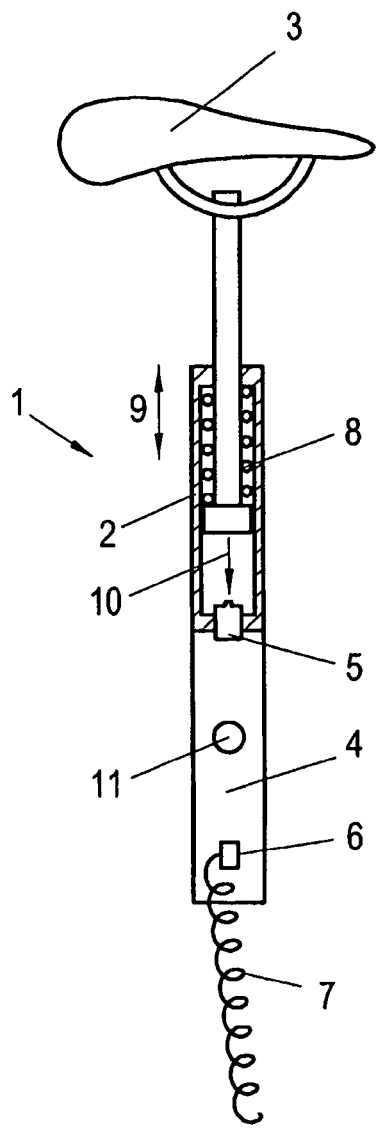
FIG. 1 is a view of a bicycle saddle according to the prior art as well as the associated frame part in which the former is mounted, with the frame part being configured as a pressure storage container.

In FIG. 1, which is not covered by the present invention, the frame of a bicycle is generally denoted by 1, FIG. 1 depicting the frame part 2 in which a bicycle saddle 3 is resiliently mounted. In the interior of the frame part 2, a portion of the frame part 2 is configured as a compressed air container 4, said compressed air container 4, on the one hand, comprising a valve 555 for filling the compressed air container with compressed air and, on the other hand, comprising a discharge opening 6 designed as a one-way valve, to which discharge opening 6 a schematically illustrated hose 7 is connectable in order to enable the filling of a bicycle tire (not illustrated) with air.

For filling the compressed air container 4, the saddle 3 is resiliently mounted in the upper region of the frame part 2 as is schematically indicated by 8, wherein, due to the resilient upward and downward movement of the saddle 3, which is schematically indicated by arrow 9, an excess pressure is generated in the frame part 2 particularly by a movement in the sense of arrow 10, which excess pressure is fed or discharged into the pressure storage container 4 via the one-way valve 5.

In order to ensure that no excess pressure, or no pressure exceeding a given limit value, is built up in the pressure container 4, the pressure container 4 is equipped with a schematically illustrated pressure relief valve 11, via which excess compressed air can be safely and reliably exhausted.

Figure 2:
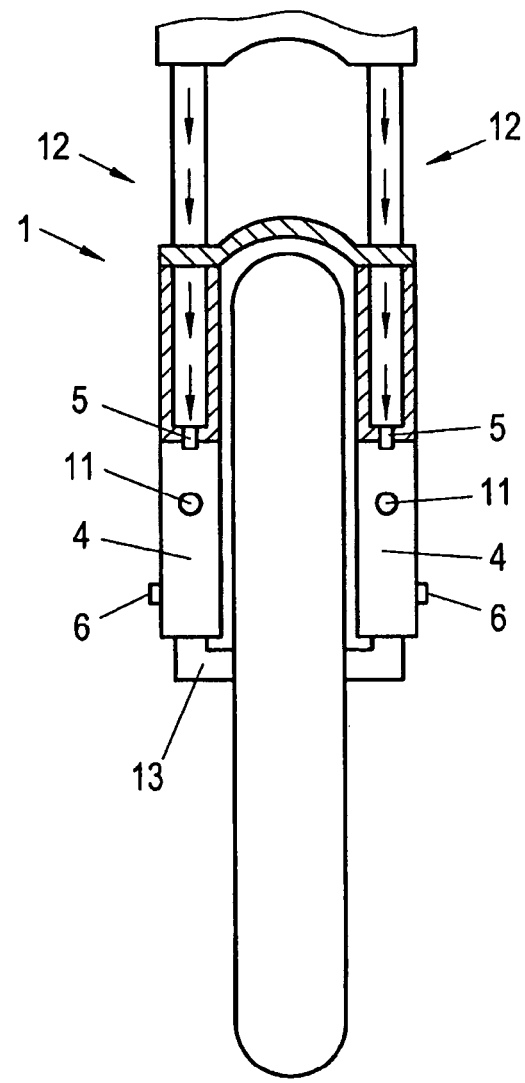
FIG. 2 is a partially sectioned front view of a bicycle fork according to the prior art, with the fork being configured as a pressure container for storing compressed air.

In the illustration according to FIG. 2, an analogous storage device for compressed air is shown in a fork part for holding, in particular, the front wheel of a vehicle. In this case, the frame is again schematically denoted by 1 and the two spars of the fork are schematically denoted by 12. The interior of the fork parts 12, particularly in its lower end portion facing the bicycle hub 13, is designed as a compressed air container 4. For filling the compressed air container 4, a filling valve 5 is again shown, wherein a discharge opening 6 is schematically indicated in the compressed air container 4, as in the illustration according to FIG. 1.

Filling of the compressed air container 4 is again effected via the resilient mounting of the fork 12 in the frame 1 of the bicycle so as to enable the feeding of compressed air into the compressed air container 4 during riding. In order to ensure that excess compressed air can be reliably exhausted, a pressure relief valve, which is schematically denoted by 11, is again provided in each of the compressed air containers 4.

In respect to the illustration according to FIG. 2, it should be noted that this device can also be provided upside down in the fork, in which case the compressed air container 4 would be formed in the upper region of the fork and the respective discharge openings would likewise be arranged in an upper region of the fork.

Figure 3:
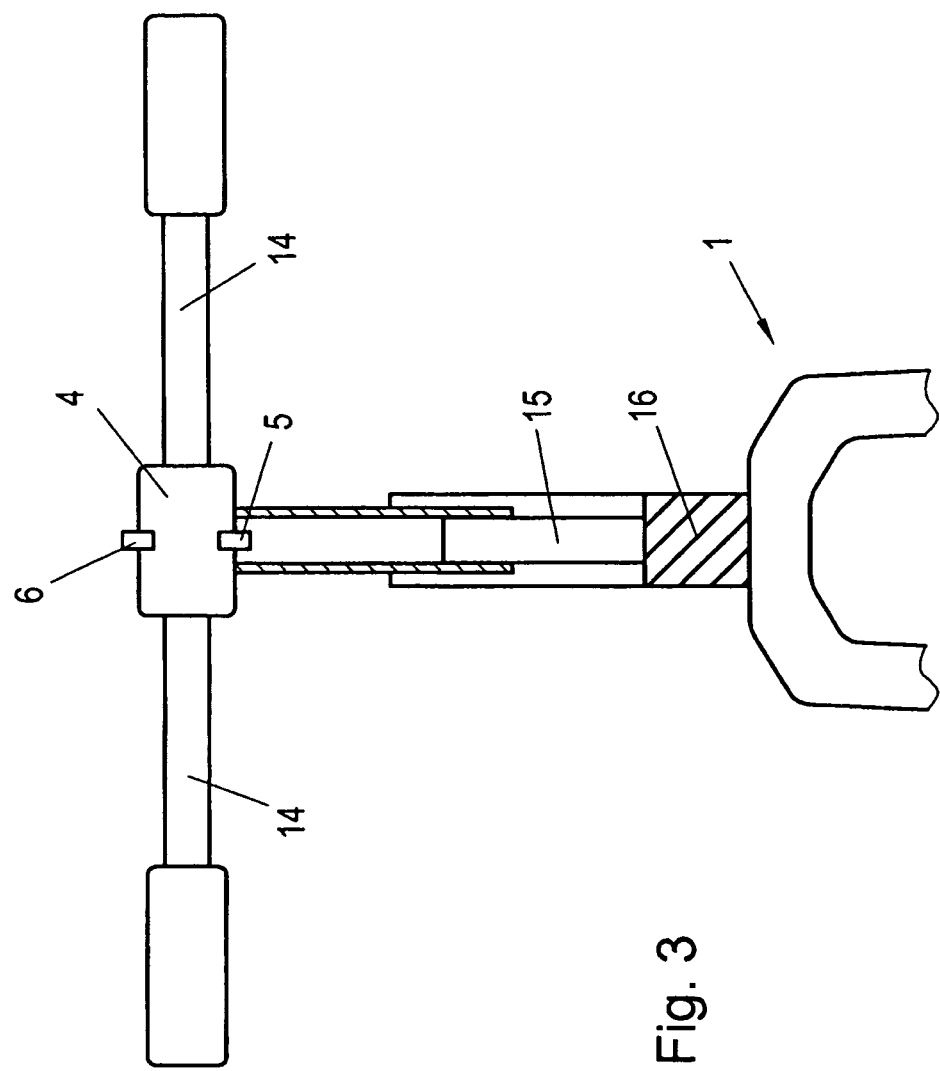
FIG. 3 is a view of a handlebar according to the prior art plus its associated frame part and fork of a bicycle, with a pressure container for storing compressed air being formed in the region of the handlebar.

Finally, in the illustration according to FIG. 3, a frame part of a bicycle is again generally denoted by 1, wherein, in this case, the compressed air container 4 is provided in the region of the handlebar 14 of the bicycle. Filling of the compressed air container 4 is again effected via a one-way valve 5 for filling the compressed air container, and the discharge of compressed air is effected via discharge opening 6 which, in the present case, is provided in the upper region of the handlebar. In order to ensure the safe mounting of, in particular, that part of the bicycle frame 1 which serves as a piston 15 for filling the compressed air container 4, the piston 15 in the illustration according to FIG. 3 is mounted on a sealing element, e.g. a rubber part 16.

Figure 4:
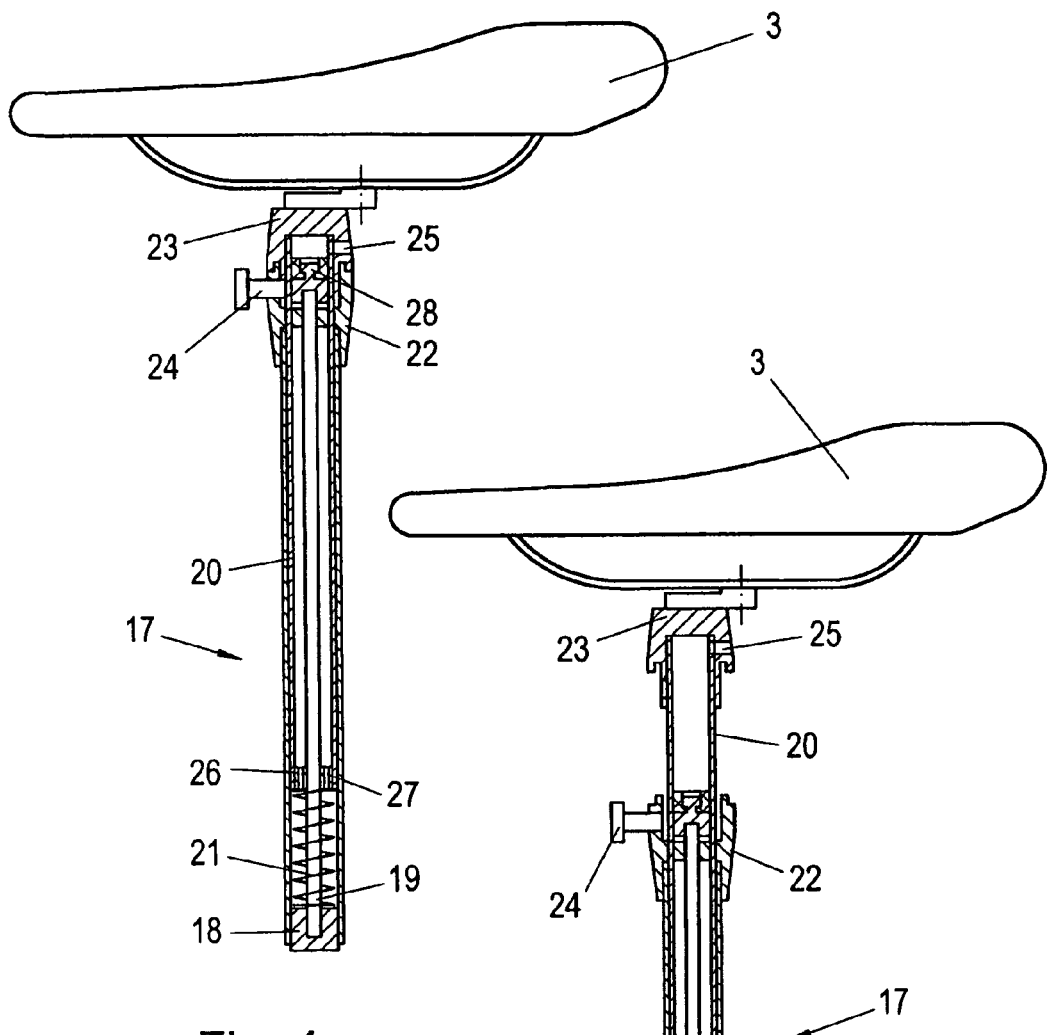
FIG. 4 is a view of a bicycle saddle or seat and its associated seat post, in which the device for generating and/or storing compressed air according to the invention is integrated.

FIG. 4 depicts a device for generating and/or storing compressed air in accordance with the present invention, wherein the device for generating compressed air is integrated in a post 17 for a bicycle saddle 3, or saddle post 17. The lower end region of the saddle post 17 in this case is provided with a detachably fixed piston nut 18, said piston nut 18 in the present case being screwed into the saddle post 17. In the interior of the piston nut 18, the device for generating compressed air is again detachably fixed, particularly by a screw connection of the pump rod 19.

The device for generating and/or storing compressed air, moreover, comprises a pump piston 20, which is guided to a reciprocating movement in the interior of the saddle tube 17. In order to ensure that the pump rod 20 will not be inadvertently extracted from the saddle tube 17 and the spring elements 21 further received in the saddle tube 17 will not inadvertently exit, a retention part 22 is, particularly detachably, fixed in the upper end portion of the saddle tube 17, or screwed to the saddle tube 17. The retention part 22 in this case cooperates with an end portion 23 in order to particularly ensure a resting position, in which the pump rod is immovably fixed relative to the saddle post 17 and an operating position, in which the pump piston 20 can be guided to a reciprocating movement relative to the saddle tube 17.

In order to provide such a detachable fixation of the end portion 23 relative to the retention part 22, the retention part in this case is provided with a lock 24 which is, in particular, configured as a latch pin 24.

Finally, the end portion 23 comprises a compressed air discharge opening 25, which is, in particular, provided with a valve, said valve having been omitted in the embodiment illustrated. Via the discharge opening 25 and, in particular, in the region of the valve, an air hose is, for instance, attachable, which is, for instance, connectable with a tire to be filled with compressed air.

These elements, which are known per se, are not illustrated in FIG. 4.

Finally, the device for generating compressed air comprises a slide bearing 26 in the interior of the pump rod, particularly on its end facing away from the end portion, which slide bearing 26 is provided with air inlets or air passages 27.

Finally, a plastic part 28 mounted for reciprocating movement is arranged in the interior of the pressure piston 20, which plastic part 28 serves as a stop element for the pump piston 19 and is guided and mounted in such a manner as to not interfere with an air flow.

Figure 5:
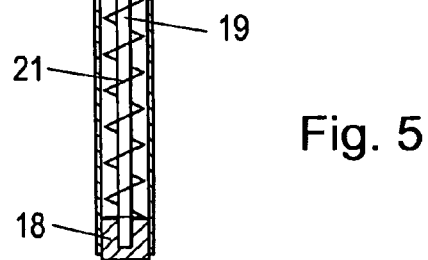
FIG. 5 is a view of the bicycle saddle according to FIG. 4, in which the device for generating and/or storing compressed air according to the invention is in the operating position.

FIG. 5, which corresponds to the illustration of FIG. 4, the device for generating compressed air is depicted in its operating position, i.e. in that position in which compressed air can be generated for filling, for instance, vehicle tires with air.

In the illustration according to FIG. 5, the latch pin 24 is released such that the end portion 23 can be detached from the retention part 22 and a pumping movement of the pump piston 20 can be performed. By that pumping movement, air is sucked into the interior of the saddle post 17 through the saddle post 17, the air, by a movement of the pump rod 20 against the force of the spring 21, is further pressed through the slide bearing 26 with air inlets 27 into the interior of the pump piston 20, and subsequently through the compressed air discharge opening 25 and the valve provided therein.

If, after this, the bicycle is to be used again for riding rather than generating compressed air, it will do to insert the end portion 23 into the retention part 22 and lock the latch pin 24, whereupon the device for generating compressed air is again locked in its resting position.

FIG. 6 depicts an analogous illustration of a device for generating compressed air, in which the device is received in a frame spar for a longitudinal rod 29. The handlebar in this case is schematically indicated at 14.

In the illustration according to FIG. 6, the device for generating compressed air is shown in its resting position, wherein, in this illustration, the piston nut 18 may, for instance, be integrated in the sealing element 16 as illustrated in FIG. 3.

All other parts of the device for generating compressed air, in the illustration according to FIG. 6, are identical with those of FIG. 4 such that they need not be described in more detail.

The illustration according to FIG. 7 finally depicts a configuration of the device for generating compressed air, in which the device is received in the fork elements 31 of a vehicle frame 1. In this illustration, the device for generating compressed air is formed in duplicate, once in each fork element 31, so as to enable, for instance, both tires of a bicycle to be inflated by one and the same pumping movement.

Bearing in mind the fact that the configuration according to FIG. 7 is also analogous to that described in FIG. 4, with the only exception that the device according to FIG. 7 is illustrated in its operating position analogously to FIG. 5, the individual elements need not be especially described.

In the illustration according to FIG. 7, only the fixation of the device for generating compressed air deviates from that of FIG. 3 and FIG. 6, respectively, since the piston nut 18 is configured such that it will, on the one hand, fulfil the function described in FIG. 4 and, on the other hand, be at the same time pierced by the wheel axle or hub 30 such that, in order to release the piston nut 18, the schematically illustrated wheel axle 30 will at first have to be removed in order to enable the piston nut 18 to be subsequently released in the manner described in FIG. 4.

The invention claimed is:

1. A device for generating compressed air for filling tires of a bicycle, the device comprising
    a saddle post of the bicycle for receiving the device, the saddle post being detachably fixed to the bicycle and being height adjustable,
    a pump cylinder moveable relative to a pump rod fixed to the saddle post for generating compressed air,
    the pump cylinder, via an end portion, being detachably fastened to the saddle post by aid of a retention part including a lock,
    the pump cylinder being provided with at least one compressed air discharge opening configured as a valve, and
    the pump cylinder being guided within the saddle post via a spring-loaded slide bearing including air passage openings, the air passage openings going through the slide bearing and being in communication with interior of the pump cylinder.

2. The device according to claim 1, wherein the lock is a latch pin.

3. The device according to claim 1, wherein the at least one compressed air discharge opening is connectable with an air filling opening of a tire.

4. The device according to claim 1, wherein the pump rod is detachably fixed in a piston nut detachably fixed in the saddle post.

5. The device according to claim 1, wherein the at least one compressed air discharge opening for compressed air is formed in said end portion of the pump cylinder.

6. The device according to claim 4, wherein a spring is provided between the slide bearing and the piston nut.

7. The device according to claim 1, wherein the saddle post is for mounting or a saddle tube.

8. The device according to claim 7, wherein a head portion of the saddle is detachably fixed to the end portion.

* * * * *

UNITED STATES PATENT AND TRADEMARK OFFICE
CERTIFICATE OF CORRECTION

PATENT NO.       : 8,641,069 B2                                    Page 1 of 1
APPLICATION NO. : 12/737291
DATED            : February 4, 2014
INVENTOR(S)      : Alexander Haager It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 16 days.

Signed and Sealed this
Twenty-second Day of September, 2015

Michelle K. Lee
*Director of the United States Patent and Trademark Office*